United States Patent Office.

THEODORE HYATT, OF NEW YORK, N. Y.

Letters Patent No. 100,632, dated March 8, 1870.

---

IMPROVEMENT IN HEAT-RESISTING MATERIALS FOR SAFES, BANK-VAULTS, &c.

The Schedule referred to in these Letters Patent and making part of the same.

---

*To whom it may concern:*

Be it known that I, THEODORE HYATT, of the city, county, and State of New York, have invented certain new and useful Improvements in Fire-Proof Safes and other structures.

My improvement relates to the production of a new combination of heat-resisting materials for filling the chambers or space between the inner and outer walls of safes, bank-vaults, and other structures, and doors for the same, to prevent the radiation of heat to the interior book-case, and destruction of its valuable contents, when the safe is exposed to fire.

For centuries asbestos has been known for its remarkable properties as a non-conductor of heat and indestructibility by fire, yet heretofore no application of this material to the construction of fire-proof safes has been productive of any valuable practical result, until my efforts in that direction were inaugurated.

To enable others skilled in the art to which my invention applies to make use of said invention, I will describe the composition and use of the same in several modes, as employed by me in practice, First, I combine one part of ground or crushed asbestos with one equal part of any chemical salt or salts, in small crystals, containing water of crystalization, mixing them well together, and with this compound filling closely the chambers or space between the inner and outer walls of the safe or other structures.

Second, I combine one part of asbestos with one equal part of any earth or earths, as Rosendale cement or plaster of Paris, thoroughly incorporated and applied, as above described.

Third, I combine one part of asbestos with one equal part of any earth or earths, and one equal part of any chemical salt or salts, containing water of crystalization, as alum or sulphate of soda, mixing these materials together, and applying them as above mentioned.

Fourth, I use asbestos alone, or combined with earth or earths and chemical salt or salts, containing water of crystalization, as heretofore described, to insulate cans or vessels holding steam or gas-producing materials from the wall or walls of the safe or other structures in the following manner: After placing the cans or vessels in their proper position in the safe, I then fill in or pack tightly with asbestos alone, or with either, the above-named compounds all the unoccupied room or space between said cans or vessels, and the wall or walls of the safe or other structures, as set forth in my patent of December 28, 1869, No. 98,381.

Fifth, I use asbestos to form a superior non-conducting wall or walls, of about one inch or more in thickness, next to and adjoining the inner or outer shells or both of them of the safe or other structures, for the purpose of insulating the central or interior and main body of filling from said wall or walls, thus protecting it from the early effects of heat, when the safe is exposed to fire.

In the above-described compounds I do not confine myself to the precise proportions stated of asbestos and earth or earths and chemical salts, as they may be varied to any extent found most effective in practice.

Having fully described my invention,

What I claim therein as new, and desire to secure by Letters Patent, is—

1. The use of asbestos, when combined with any steam or gas-producing materials as a filling for fire-proof safes and other structures.

2. The use of asbestos, when combined with any earth or earths as a filling for fire-proof safes and other structures, in the manner and for the purposes substantially as described.

3. The use of asbestos, when combined with any earth or earths and any chemical salt or salts, containing water of crystalization, as a filling for fire-proof safes and other structures in the manner and for the purposes substantially as set forth.

4. The use of asbestos as described, in either of the foregoing claims, when combined with cans or vessels containing steam or gas-producing materials, as a filling for fire-proof safes and other structures, in the manner and for the purposes substantially as described.

5. The use of asbestos for lining to any desirable thickness, the wall or walls of the safe or other structures on their interior surfaces, looking into the fire-proof chambers, for the purpose of insulating from said walls the principle or main body of filling, composed of any suitable material or materials that may be used for that purpose, in the manner substantially as set forth.

THEODORE HYATT.

Witnesses:
A. L. HAYES,
F. W. RITTER, Jr.